(12) United States Patent
Artishdad et al.

(10) Patent No.: US 9,344,559 B2
(45) Date of Patent: May 17, 2016

(54) METHOD AND DEVICE FOR THE LEGALLY SECURE ARCHIVING OF TELEPHONE CONTENTS

(75) Inventors: Jerry John Artishdad, Karben (DE); Christian Hett, Niddatal (DE); Alexander Naumann, Frankfurt am Main (DE)

(73) Assignee: Artec Computer GmbH (DE)

( * ) Notice: Subject to any disclaimer, the term of this patent is extended or adjusted under 35 U.S.C. 154(b) by 614 days.

(21) Appl. No.: 13/578,187

(22) PCT Filed: Feb. 23, 2011

(86) PCT No.: PCT/EP2011/052702
§ 371 (c)(1),
(2), (4) Date: Aug. 9, 2012

(87) PCT Pub. No.: WO2011/107386
PCT Pub. Date: Sep. 9, 2011

(65) Prior Publication Data
US 2012/0323856 A1    Dec. 20, 2012

(30) Foreign Application Priority Data
Mar. 1, 2010  (DE) .......................... 10 2010 009 765

(51) Int. Cl.
*H04M 3/42*    (2006.01)
*H04M 1/64*    (2006.01)
*H04M 3/58*    (2006.01)

(52) U.S. Cl.
CPC ............ *H04M 3/42221* (2013.01); *H04M 1/64* (2013.01); *H04M 3/58* (2013.01)

(58) Field of Classification Search
CPC ....... H04M 1/64; H04M 1/642; H04M 1/656; H04M 3/42221; H04M 3/58; H04M 2203/5018; H04M 2250/68
USPC ......... 379/41, 51, 67.1, 68, 76, 85, 87, 88.05, 379/88.06, 88.12, 88.13, 88.22, 88.25, 379/88.26, 112.01, 126, 133, 266.1, 373.04, 379/207.16; 704/235
See application file for complete search history.

(56) References Cited

U.S. PATENT DOCUMENTS 6,188,766 B1   2/2001  Kocher
6,529,602 B1   3/2003  Walker et al.
(Continued)

FOREIGN PATENT DOCUMENTS

DE    10261478 A1    7/2004
DE    102006025369 A1  6/2007
WO    2004/077803 A1  9/2004

OTHER PUBLICATIONS

Pressemitteilung,Hessische Minister informieren sich bei ARTEC ueber Moeglichkeiten zur Langzeitarchivierung von Sprachdaten, ARTEC IT Solutions, 2012.
Gutachten EMA:"Project VoIPS-Rechtssicheres Archivieren von Internettelefonie Rechtsgemaesse Gestaltung der EMA E-Mail Archive Appliance", Apr. 2009, UaiKS_V2.0.
Science Allemagne:"Die sichere digitale Identitaet", Mar. 2009.
(Continued)

*Primary Examiner* — Md S Elahee
(74) *Attorney, Agent, or Firm* — Emerson Thomson Bennett, LLC; Roger D. Emerson

(57) ABSTRACT

The present invention relates to a method and a device for the legally secure archiving of telephone contents. In particular, it should be possible to provide a legally compliant possibility of longtime archiving for telephone conversations and faxes. This is achieved by the system according to the invention for the legally secure archiving of telephone contents, comprising a. a control module (A) for telephone connections; b. a communication module (I) for ISDN links and/or a communication module (V) for VoIP connections and/or a communication module (X) for IAX connections; c. an administration module (S) to which an internal data storage unit (T1) and/or one or several external data storage units (T2, T3) are connected; d. a configuration module (K) for the configuration of the control module (A) and the administration module (S), wherein—the control module (A) is connected to the communication module (I), the communication module (V) and/or the communication module (X) as well as to the administration module (S), —the communication module (I) is connected to one or several telephone terminals and/or a telephone installation, —the communication module (V) is connected to a VoIP server, —the communication module (X) is connected to an IAX server, —the configuration module (K) and the administration module (S) have a network connecting possibility for clients. The is further achieved by a method for the legally secure archiving of telephone contents according to the main claim.

14 Claims, 4 Drawing Sheets

(56) References Cited

U.S. PATENT DOCUMENTS

| | | | |
|---|---|---|---|
| 6,661,879 | B1 | 12/2003 | Schwartz et al. |
| 7,466,334 | B1 | 12/2008 | Baba |
| 7,502,131 | B2 | 3/2009 | Kato et al. |
| 2001/0164007 | | 11/2002 | Henits |
| 2002/0164007 | A1 | 11/2002 | Henits |
| 2004/0186712 | A1* | 9/2004 | Coles et al. .................. 704/235 |
| 2007/0036283 | A1 | 2/2007 | Shaffer et al. |
| 2008/0298253 | A1 | 12/2008 | Walker et al. |
| 2009/0220067 | A1* | 9/2009 | Leeds ...................... 379/207.16 |
| 2010/0020943 | A1 | 1/2010 | Hasegawa |
| 2010/0142387 | A1 | 6/2010 | Kramarz-von Kohout |
| 2011/0182420 | A1 | 7/2011 | Kramarz von Kohout |

OTHER PUBLICATIONS

Signaturgesetz-SigG:Gesetz ueber Rahmenbedingungen fuer elektronische Signaturen, May 2001,Bundesministerium mit Juries GmbH.

Jahresbericht 2006 BinBDI 2006, Dec. 2006.

ITU-T H.323(Jun. 2006):"Series H:" Audiovisual and Multimedia Systems, Infrastructure of audiovisual Services—Systems and terminal equipment for audiovisual Services;Jun. 2006, Switzerland Geneva 2007.

ITU-T T.38 (Apr. 2007):"Series T: Terminals for Telematic Services, Facsimile—Group 3 protocols Procedures for real-time Group 3 facsmile communication over IP networks",Switzerland Geneva 2008.

* cited by examiner

METHOD AND DEVICE FOR THE LEGALLY SECURE ARCHIVING OF TELEPHONE CONTENTS

CROSS REFERENCE TO RELATED APPLICATIONS

This application is the US-national stage of PCT application PCT/EP2011/052702 filed 23 Feb. 2011, published 9 Sep. 2011 as WO2011/107386, and claiming the priority of German patent application 102010009765.9 itself filed 1 Mar. 2010.

FIELD OF THE INVENTION

The present invention relates to a method and a system for the legally valid archiving of telephone communication contents. In particular, invention relates to a legally compliant long-term archiving option for telephone conversations and faxes.

BACKGROUND OF THE INVENTION

In commercial transactions, it is often necessary to record telephone conversations, for example as evidence of contractual agreements. Two main problem areas arise from this. On the one hand, the provisions of the data protection act must be observed in making the recordings and on the other hand—likewise in compliance with the provisions of the data protection act—an auditable long-term archiving of the recorded conversations is necessary.

Magnetically or digitally recording hardware solutions that can be connected to a conventional telephone are generally known in the field of telephone recordings. Information of the conversation partner/s of the recorded telephone conversations is hereby dependent on the announcement by the recording party. Furthermore, purely audio recordings are available that cannot provide any verified proof of the time they were made or of their unmodified originality. Similar solutions are known in particular in the field of Internet telephony by means of voice over IP (VoIP). Here software records the conversations on the subscriber's computer as an audio file. The same disadvantages apply here too as with the hardware solutions for standard telephones.

OBJECT OF THE INVENTION

The object of the present invention was therefore to develop a solution with the aid of which a telephone connection can be controlled such that, depending on the consent of the conversation partner to a recording, a recording of telephone conversations can be carried out and this recording can be stored in a legally valid manner in compliance with data protection and maintaining the special conclusive force of recorded natural speech in an archive data storage system for long-term archiving. Likewise, archiving fax transmissions with conclusive force should be rendered possible.

SUMMARY OF THE INVENTION

This object is attained by means of a method for the legally valid archiving of telephone communication contents at least containing the steps
 a. With internal calls
  accepting the call
  determining a target call number
  calling the target call number
  playing a recording notification
  requesting consent by the called party
  if consent is granted by the called party, connecting the subscribers and announcing the recording status, otherwise terminating the call or other configured behavior in the case of refusal
  if consent is granted by the called party, recording the conversation in an audio file
  if consent is granted by the called party, providing the audio file with a time stamp and enhanced signature
  if consent is granted by the called party, storing the time-stamped and signed audio file in an archive storage system for long-term archiving.
 b. With external calls
  accepting the call
  playing a recording notification
  determining consent by the caller
  if consent is granted by the caller, establishing the connection with the internal subscriber and announcement of the recording status, otherwise terminating the call or other configured behavior in the case of refusal
  if consent is granted by the caller, recording the conversation in an audio file
  if consent is granted by the caller, providing the audio file with a time stamp and enhanced signature
  if consent is granted by the caller, storing the time-stamped and signed audio file in an archive storage system for long-term archiving.
 c. With conference calls
  accepting the call from a conference participant, who would like to have the conference call recorded
  playing a recording notification
  connecting the system as conference participant
  recording conference conversation in an audio file
  providing the audio file with a time stamp and enhanced signature
  storing the time-stamped and signed audio file in an archive storage system for long-term archiving or
  accepting the call from a conference participant who would like to have the conference conversation recorded
  connecting the system as a conference participant terminating the connection of the calling conference participant with the conference call
  playing a recording notification
  determining consent of the conference participants
  if consent is granted by the conference participants, the caller is called back for inclusion in the conference and announcement of the recording status, otherwise terminating the conference connection or other configured behavior with refusal
  if consent is granted by conference participants, recording conference conversation in an audio file
  if consent is granted by the conference participants, providing the audio file with a time stamp and enhanced signature
  if consent is granted by the conference participants, storing the time-stamped and signed audio file in an archive storage system for long-term archiving.
 d. With fax contents, wherein the distinction between fax contents and voice contents takes place automatically
  accepting the call
  with outgoing fax calls, determination of the target call number and connecting with the fax machine or fax server
  with incoming fax calls, connecting with the internal fax machine or fax server recording the fax in a recording file, wherein the recording is transparent only for the fax machines and/or fax servers involved providing the recording file with a timestamp and enhanced signature storing the time-stamped and signed recording file in an archive storage system for long-term archiving furthermore, the object is attained with the system according to the invention for the legally valid archiving of telephone communication contents, comprising a. A control module (a) for telephone connections b. A communication module (I) for ISDN connections and/or a communication module (V) for VoIP connections and/or a communication module (X) for IAX connections, c. An administration module (S) to which an internal data storage system (T1) and/or one or more external data storage systems (T2, T3) are connected, d. A configuration module (K) for the configuration of control module (A) and administration module (S), wherein Control module (A) is connected to communication module (I), communication module (V) and/or communication module (X) as well as to administration module (S), Communication module (I) is connected to one or more telephony terminals and/or to a telephone system Communication module (V) is connected to a VoIP server, Communication module (X) is connected to an IAX server, Configuration module (K) and administration module (S) have a network connection option for clients.

SPECIFIC DESCRIPTION OF THE INVENTION

Figure 1:
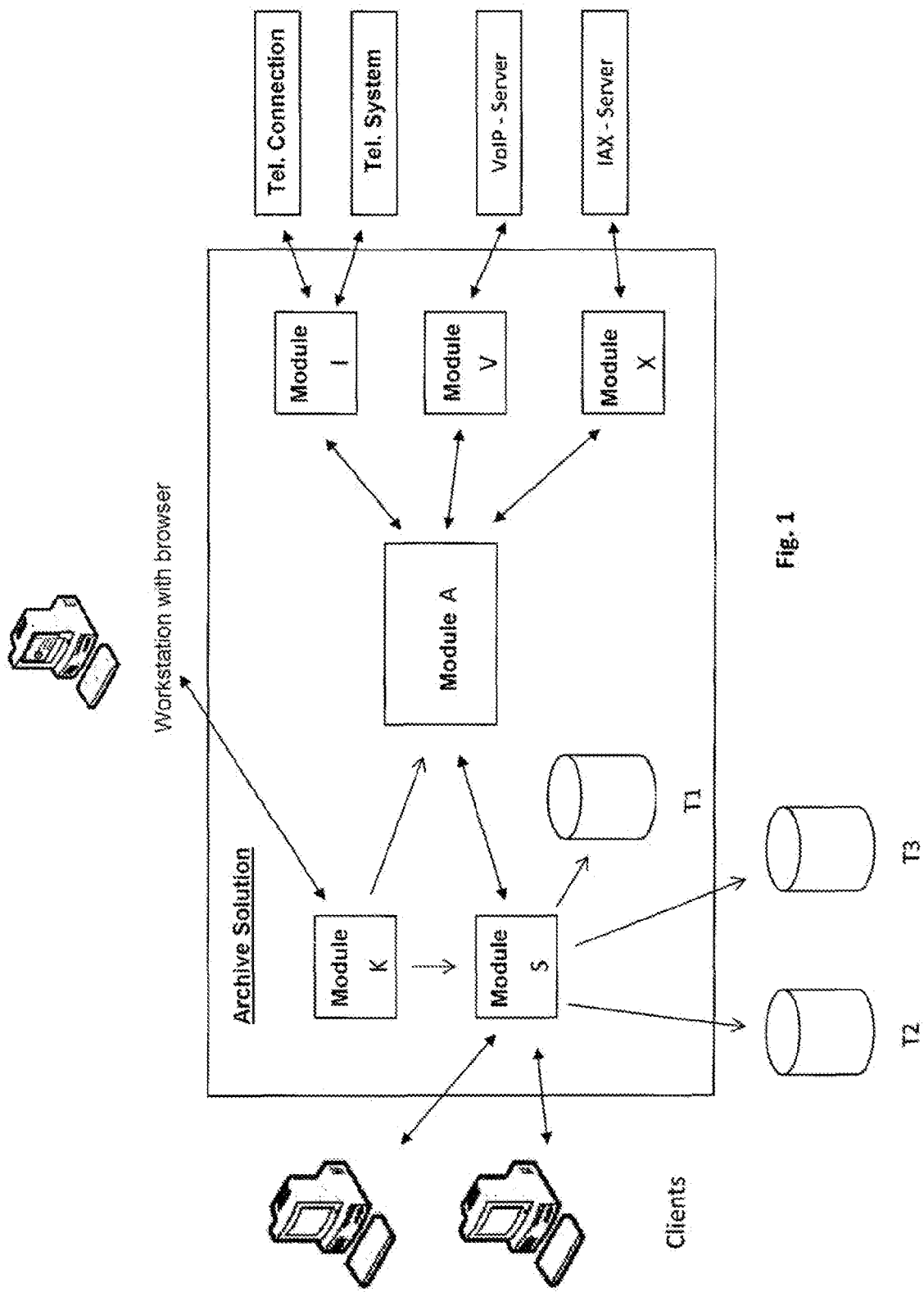
FIG. 1 is a schematic diagram of the system of this invention.

The system according to the invention is composed of several modules that can be embodied as hardware components as well as software components. The diagrammatic structure of the system is shown in FIG. 1. The control module (A) is used to control conversations of all kinds. This module is configured by the configuration module (K). Special connection variants exist in the form of modules (I), (V) and (X). Communication module (I) is used for communication of control module (A) with one or more telephony terminals and/or a telephone system, communication module (V) for the communication of control module (A) with a VoIP server, and communication module (X) for communication to an IAX server.

Communication module (I) preferably controls an ISDN card with connections via S0 buses and multiplex and is connected thereby to one or more telephony terminals and/or a telephone system. The communication module (V) ensures the communication to a VoIP server and preferably has SIP/SIPS and/or H.323 protocols and is accordingly connected to SIP/SIPS and/or H.323 servers. Communication module (V), communication module (X) to an IAX server.

The configuration of the modules (I), (V) and (X) is flexible and is carried out via configuration module (K). The configuration module (K) is very preferably embodied as a Web service.

Preferably, one or more fax machines are connected to the communication module (I), communication module (V) and/or communication module (X) in order to render possible an original fax output in addition to the archiving.

Administration module (S) is used for the administration of control module (A) and the legally valid archiving of the data of control module (A). The administration module (S) is also configured via the configuration module (K).

The administration module (S) furthermore has a connection to the data storage system (T1) mounted in the system and/or to one or more external data storage systems (T2) and (T3) configured via the configuration module (K).

Four different scenarios are provided for archiving, which represent and control different scenarios of a possible telephone conversation with the recording thereof. These individual scenarios can be configured in a detailed manner independently of one another.

Each scenario can be assigned to certain call numbers (one or several). Likewise, it can also be established via which connections (ISDN port, IAX port or VoIP access) a defined scenario can be achieved by the communications modules (I), (V) and (X). A finite number of scenarios, also for different fields or companies, can be defined in different languages. Hosting is also possible.

During a dialing operation or the announcement to one of the two conversation partners, it can be determined whether the other participant will hear on-hold music or a predefined announcement.

The announcements and confirmations of the recording are helpful for a legally valid recording and archiving of the conversations, in particular in order to comply with data protection provisions.

The method according to the invention defines four scenarios: Gateway, Forward, Conference and Conference with Callback, as well as Fax.

Figure 2:
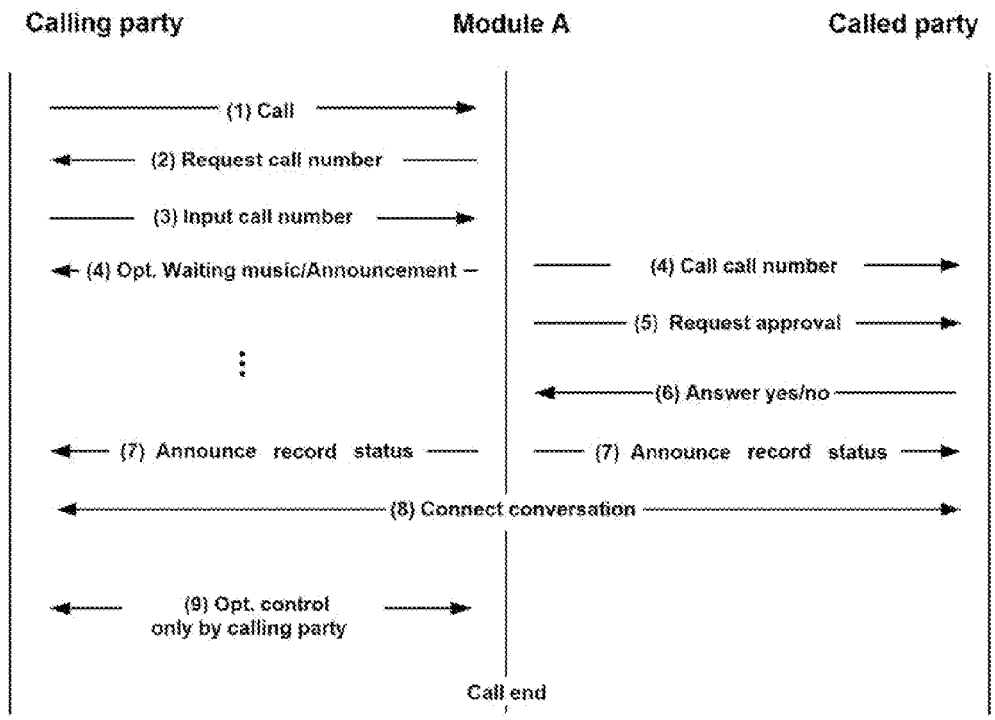
FIG. 2 is a diagram of a gateway scenario.

FIG. 2 shows diagrammatically the Gateway scenario. In this scenario the caller is requested by the system to enter (or transmit by other means) a call number. This call number is then called by the system and the called party is asked whether he consents to a recording of the conversation or not. In the event of a refusal, the conversation could be ended immediately. The caller is informed of the decision by the called party, subsequently both subscribers are connected to one another. It is possible to define which call numbers may reach this scenario and whether this should be reachable only by internal call numbers or by external call numbers. Likewise, the configuration of a list of permitted target call numbers is also possible.

Figure 3:
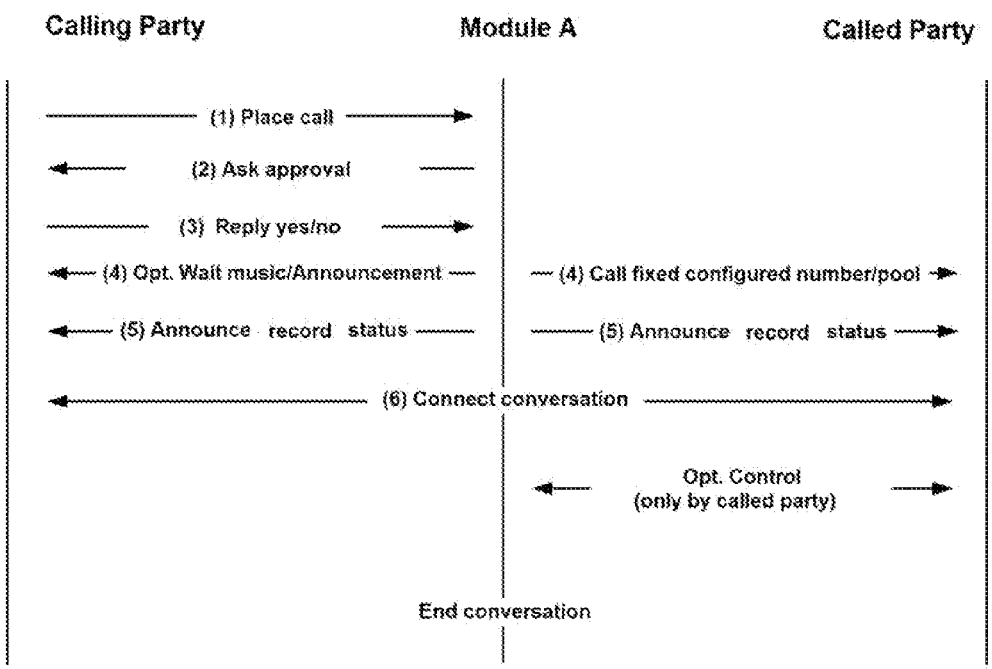
FIG. 3 is a diagram of a forwarding scenario.

FIG. 3 shows the Forward scenario diagrammatically. The idea of this scenario is the establishment of a fixed target call number or also a call number pool, to which the call is transferred. In this scenario, a caller calls the system and at the start is asked whether he consents to a recording of the following conversation. By actuating one of two configurable keys, the caller can consent to this recording or refuse it. Alternatively, a verbal agreement via voice recognition is possible. A refusal can also be deactivated so that only a confirmation takes place or the caller must hang up if he objects to the recording. It can be configured whether the conversation is immediately terminated with a refusal of the recording.

After the key has been pressed or the verbal agreement has been given, the fixed target call numbers are called according to a fixed plan by the system and the called party—if configured—is informed of the status of the selection of the caller.

Furthermore it is possible not to request an entry of a key or verbal consent; in this case a refusal must be carried out by hanging up or a subsequent stoppage of the recording. Subsequently, both subscribers are connected in the system and the conversation partners are in contact with one another. A recording has been running since the start of the announcement that the conversation is being recorded, wherein the recording is deleted again if consent is refused.

It is possible to define which call numbers may reach this scenario and whether this is to be reachable only by internal call numbers or by external call numbers.

Figure 4A:
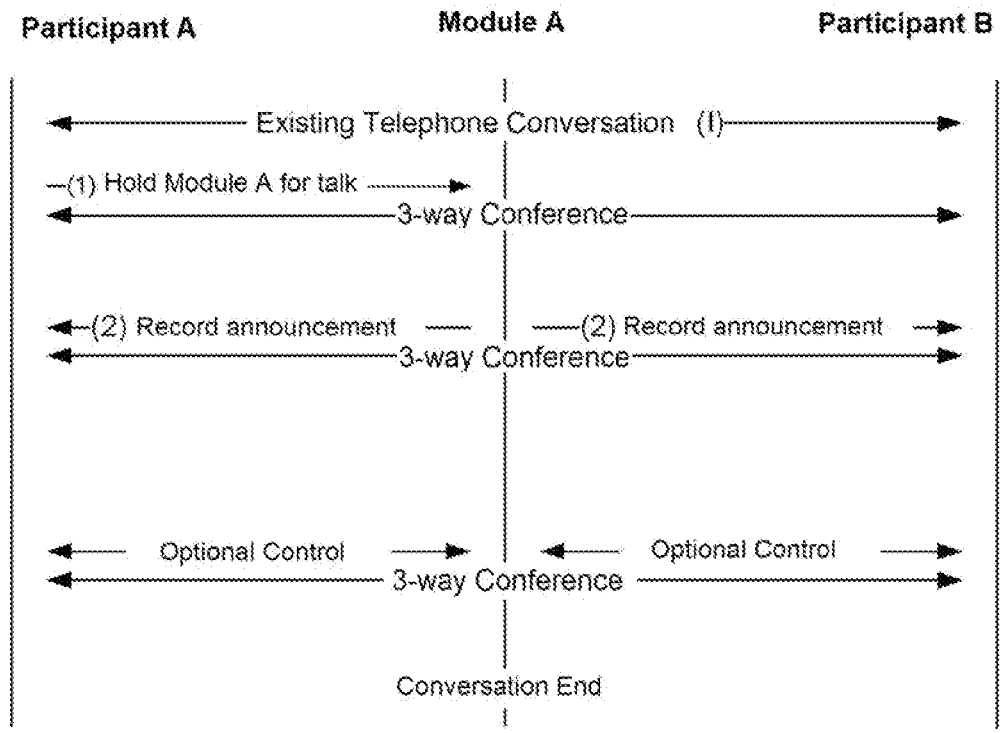
FIG. 4a is a diagram of a three-way conference scenario.
Figure 4B:
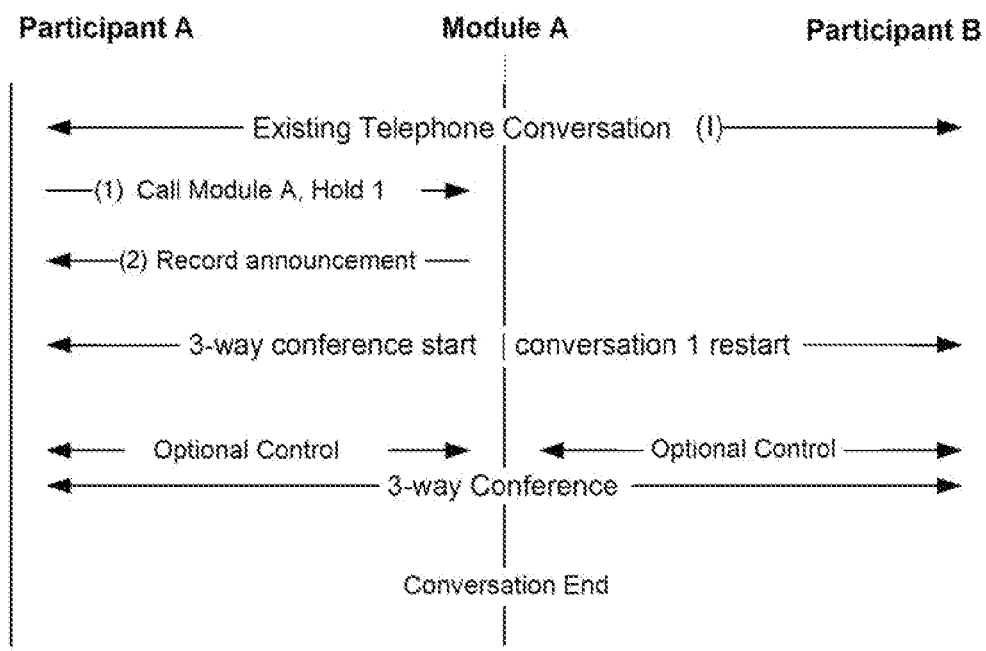
FIG. 4b is a diagram of a three-way conference with hold.
Figure 5:
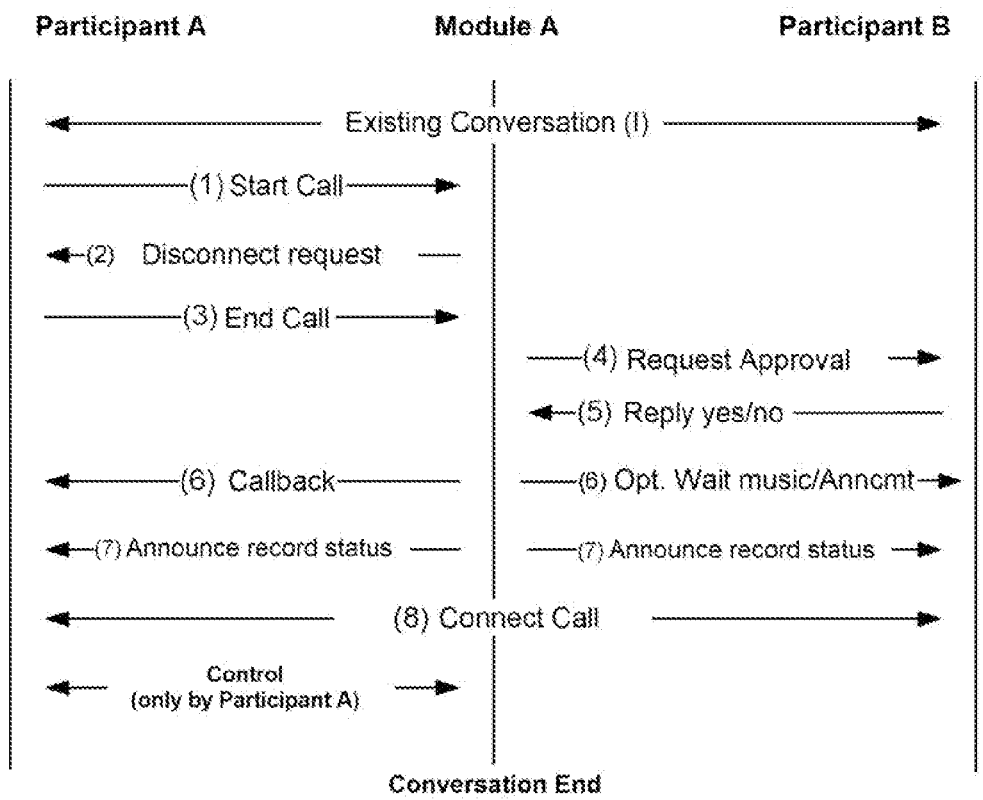
FIG. 5 is a diagram of a conference with callback.

The third scenario, Conference and Conference with Callback, is shown in FIGS. 4a, 4b and 5. FIG. 4a thereby shows the sequence with a telephone system that renders possible an immediate start of a three-way conference. FIG. 4b shows the corresponding variant of a telephone system that renders possible the start of a three-way conference only by combining held connections.

The system can be connected to an existing telephone conversation by one to n subscribers any time for the purpose of recording. This then forms a conference connection in the extended sense. Depending on the telephone system, only the caller of the system or all of the subscribers hear the confirmation that it will be recorded starting immediately. Depending on the telephone system, the conversation must be guided back into the telephone call previously made. A recording, if configured, can be stopped or controlled in another manner at any time. Each participant in the call hereby has the ability to do this.

FIG. 5 shows the sequence of the Conference with Callback. This scenario differs from the above-mentioned Conference scenario in that the caller of the system is requested to end his conversation immediately. Thereupon the other participants are asked whether they consent to or refuse a recording the conversation. In the case of a refusal, the conference call connection can be terminated immediately. In the case of a recording, this is announced and the caller is called back by the system, he is notified of this decision and he is incorporated in the existing conference telephone call again.

It is guaranteed by means of the call back that the other participant/s in the conference, who did not start the recording, are aware in any case of the notification and optional consent, while the above-referenced conference scenario cannot guarantee this, depending on the telephone system.

The fourth scenario, Fax, does not include a request for consent to the recording, since consent is not necessary or possible here. The distinction of whether they are voice contents or fax messages, is hereby carried out automatically. A distinction is thereby to be made between incoming and outgoing faxes.

In the case of outgoing faxes, the system is called by the internal fax machine/fax server, determines the target call number and connects to the fax machine or fax server. The determination of the target call number can thereby be made, for example, from a suffix of the dialed fax number, the prefix of which is the internal call number of the system. In the case of incoming faxes, the system connects to the internal fax machine/fax server.

Subsequently, the fax is recorded, wherein the communication between the fax machine to which it is forwarded, and the fax machine that sends the fax is passed on 1:1 so that the fax machines do not notice that the faxes have been archived on the system, i.e., the recording is transparent for them.

Preferably, the recording file for fax transmissions is a audio file, in particular a compressed format, preferably MP3 or WMA, a digital ISDN file, a graphic file, in particular TIF or JPG, and/or a document file, in particular PDF or, after prior OCR conversion, a text file.

One possible variant for the fax operation is to forward by e-mail, to print and to archive the fax data transmitted to the administration module (S) or after transmittal to delete them, filter them or only to archive the, for example controlled by a set of rules, and to send a notification.

As a last process step, with all of the scenarios the provision of the recording file with a time stamp and enhanced signature and the deposit of the time-stamped and signed recording file in the archive storage system for long-term archiving take place.

Figure 6:
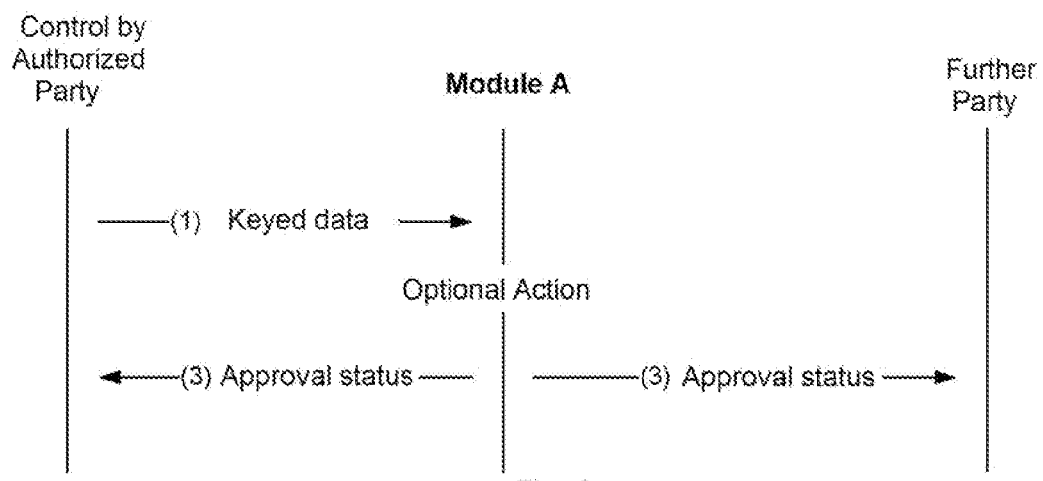
FIG. 6 is a diagram of a call-recording scenario.

The control of the conversation recording is illustrated in FIG. 6. With all of the scenarios the recording status can be controlled during a conversation, if this is configured by configuration module (K). To this end each of the following points can be configured individually and established whether this is possible at all.

A party authorized for control for this purpose can send a control action via a configurable key to the control module (A). The control module (A) carries out the desired action, as appropriate. A conversation recording can be stopped, started, deleted or started anew. Likewise, as appropriate, the previous recording can be deleted. For each of these actions an announcement can be configured that both conversation partners hear and the keys that lead to this action. Furthermore, the current recording status can be retrieved.

Very particularly preferably the recorded conversation or fax files are cryptographically encoded before storage in the archive data storage system in order to protect them from unauthorized access.

In an advantageous embodiment variant of the method, a selection from different announcement texts, in particular in different languages, takes place based on the call number and/or the country code of the external caller. It can thus be ensured that every caller can also understand the announcement text. With each of the scenarios according to the invention, it must be ensured that conversations cannot be linked to other conversations. Also with the end of a call, a recording possibly running must be ended immediately and the line of the other conversation partner must be closed. An invalid input of a call participant must be recognized as well as a missing input and handled accordingly. This can be carried out by a new request, which can be limited in number or also lead to the end of the conversation. The acceptance of calls with suppressed call number can be prevented.

Before accepting the call, it is ensured by administration module (S) that a reliable storage of the recording can be carried out, for example in that the reachability of the external storage system (T2) is verified, if the system is configured such that data have to be available immediately on at least two storage systems.

The announcements for the caller and the called party can be different.

In general it can be configured how many attempts a call participant has in the selection of whether the conversation is to be recorded.

Preferably, a keyword indexing or also setting metadata after a call recording has been completed is possible by each client via the administration module (S). The automatic setting of these metadata by the system is possible based on criteria such as the call numbers or the scenario or the time. This is carried out by the administration module (S) via a set of rules to be configured or a conversion of the conversation data into text. Advantageously, a keyword indexing of the telephone call is carried out by means of speaker-independent speech recognition from the recorded conversation and storage of the keywords together with the recorded audio file.

Furthermore, an input mask for information on the telephone call is displayed preferably on a client computer with speech telephone communication contents, and at the end of the telephone call this information is saved together with the recorded audio file. To this end during a conversation it can be signaled to one of the configured clients that a recording is running. He has the option during the recording via a mask on the client or the system to provide the conversation with metadata and further information. On the client, these metadata can be set via a program during the conversation, to which the start, the course and the end of a conversation and the recording thereof is signaled by the administration module (S).

Recorded conversations can be searched and found based on the metadata, but even without these data it is possible to find these conversations. Identification is possible based on the call numbers or the time.

An advantageous embodiment variant of the method according to the invention provides that, in addition to the recorded audio file, the call number of the internal or external subscriber is stored in the archive data storage system as a search criterion and/or authorization criterion for an archive retrieval.

Via the system a recording can be listened to, downloaded and the signature can be verified insofar as the necessary rights, protected and verified by the administration module (S), are given.

The invention claimed is:

1. A method for the legally valid archiving of telephone communication contents containing the steps
   With internal calls
      accepting a first call from a first caller;
      determining a target call number;
      calling the target call number;
      playing to a first called party a notification of recording the conversation between the first caller and the first called party;
      requesting consent by the first called party;
      if consent is granted by the first called party, connecting the first caller and the first called party and announcing the recording status, otherwise terminating the first call or other configured behavior in the case of refusal;
      if consent is granted by the first called party, recording the conversation in an audio file;
      if consent is granted by the first called party, providing the audio file with a first time stamp and enhanced signature;
      if consent is granted by the first called party, storing the first time-stamped and signed audio file in an archive storage system for long-term archiving;
   With external calls
      accepting a second call from a second caller;
      playing to a second called party a notification of recording the conversation between the second caller and the second called party;
      determining consent by the second caller;
      if consent is granted by the second caller, establishing the connection with the internal subscriber and announcement of the recording status, otherwise terminating the call or other configured behavior in the case of refusal;
      if consent is granted by the second caller, recording the conversation in an audio file;
      if consent is granted by the second caller, providing the audio file with a second time stamp and enhanced signature;
      if consent is granted by the second caller, storing the second time-stamped and signed audio file in an archive storage system for long-term archiving;
   With conference calls
      accepting a third call from a conference participant who would like to have the conference call recorded;
      playing to a third called party a notification of recording the conversation between the third caller and the third called party;
      connecting the system as conference participant;
      recording conference conversation in an audio file;
      providing the audio file with a third time stamp and enhanced signature;
      storing the third time-stamped and signed audio file in an archive storage system for long-term archiving;
      or
      accepting the call from a conference participant who would like to have the conference conversation recorded;
      connecting the system as a conference participant;
      terminating the connection of the calling conference participant with the conference call;
      playing a recording notification;
      determining consent of the conference participants;
      if consent is granted by the conference participants, the third caller is called back for inclusion in the conference and announcement of the recording status, otherwise terminating the conference connection or other configured behavior with refusal;
      if consent is granted by the conference participants, recording the conference conversation in an audio file;
      if consent is granted by the conference participants, providing the audio file with a fourth time stamp and enhanced signature;
      if consent is granted by the conference participants, storing the fourth time-stamped and signed audio file in an archive storage system for long-term archiving;
   With fax contents where the distinction between fax contents and voice contents takes place automatically
      accepting a fourth call;
      with outgoing fax calls, determining the target call number and connecting with the fax machine or fax server;
      with incoming fax calls, connecting with the internal fax machine or fax server;
      recording the fax in a recording file that is transparent for the fax machines or fax servers involved;
      providing the recording file with a fifth time stamp and enhanced signature;
      storing the fifth time-stamped and signed recording file in an archive storage system for long-term archiving.

2. The method according to claim 1, wherein a selection from different announcement texts in different languages takes place based on the call number or the country code of the external caller.

3. The method according to claim 1, wherein the consent to recording is carried out verbally or by key input and the recording takes place with the start of the query, the recording being deleted again if consent is refused.

4. The method according to claim 1, wherein an input mask for information on the telephone call is displayed on a client computer with speech telephone communication contents, and at the end of the telephone call this information is saved together with the recorded audio file.

5. The method according to claim 1, wherein in addition to the recorded audio file, the call number of the internal or external subscriber is stored in the archive data storage system as a search criterion or authorization criterion for an archive retrieval.

6. The method according to claim 1, wherein a keyword indexing of the telephone call is carried out by speaker-independent speech recognition from the recorded conversation and these keywords are stored together with the recorded audio file.

7. The method according to claim 1, wherein during the conversation control of the recording function can be carried out by the party initiating the recording or by all of the participants in the conversation.

8. The method according to claim 1, wherein the recording file for fax transmissions is an audio MP3 or WMA file, a digital ISDN file, a graphic TIF or JPG file, or a PDF document file or, after OCR conversion, a text file.

9. The method according to claim 1, wherein the recorded conversation or fax files are cryptographically encoded before storage in the archive data storage system.

10. A system for the legally valid archiving of telephone communication contents according to claim 1, the system comprising
a control module for telephone connections,
an ISDN communication module for ISDN connections, or a VoIP communication module for VoIP connections, or
an IAX communication module for IAX connections, an administration module to which an internal data storage system or at least one external data storage system is connected,
a configuration module for the configuration of the control module and the administration module,
wherein
the control module is connected to the ISDN communication module, the VoIP communication module, or the IAX communication module as well as to the administration module,
the ISDN communication module is connected to one or more telephony terminals or a telephone system,
the VoIP communication module is connected to a VoIP server,
the IAX Communication module is connected to an IAX server, and
the configuration module and the administration module have a network connection option for clients.

11. The system according to claim 10, wherein the VoIP communication module has SIP/SIPS or H.323 protocols and accordingly is connected to SIP/SIPS or H.323 servers.

12. The system according to claim 10, wherein the configuration module is a Web service.

13. The system according to claim 10, wherein the ISDN communication module controls an ISDN card and furthermore is connected to one or more telephony terminals or a telephone system.

14. The system according to claim 10, wherein one or more fax machines are connected to the ISDN communication module, the VoIP communication module or the IAX communication module.

* * * * *